No. 867,348. PATENTED OCT. 1, 1907.
A. D. CROSLEY.
NEST BOX FOR FOWLS.
APPLICATION FILED FEB. 14, 1907.

2 SHEETS—SHEET 1.

Witnesses
F. L. Ourand
C. N. Griesbauer

Inventor
Albert D. Crosley
by H. B. Willson & Co
Attorneys

No. 867,348. PATENTED OCT. 1, 1907.
A. D. CROSLEY.
NEST BOX FOR FOWLS.
APPLICATION FILED FEB. 14, 1907.
2 SHEETS—SHEET 2.
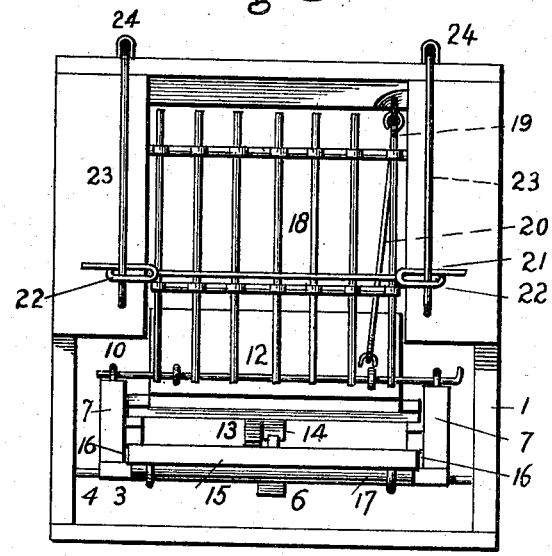
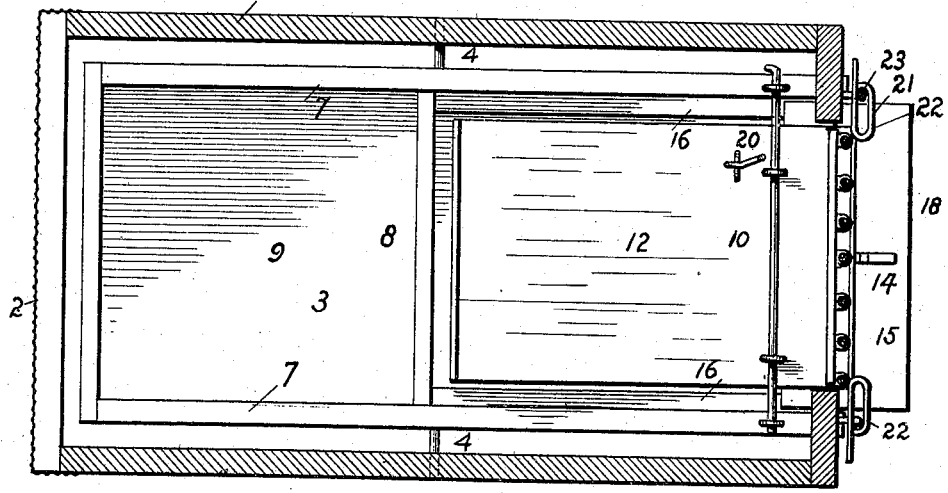
Witnesses
F. L. Ourand
C. H. Griesbauer.
Inventor
Albert D. Crosley
by H. B. Willson & Co.
Attorneys

UNITED STATES PATENT OFFICE.

ALBERT D. CROSLEY, OF JEWELL, IOWA.

NEST-BOX FOR FOWLS.

No. 867,348.   Specification of Letters Patent.   Patented Oct. 1, 1907.

Application filed February 14, 1907. Serial No. 357,360.

*To all whom it may concern:*

Be it known that I, ALBERT D. CROSLEY, a citizen of the United States, residing at Jewell, in the county of Hamilton and State of Iowa, have invented certain new and useful Improvements in Nest-Boxes for Fowls; and I do declare the following to be a full, clear, and exact description of the invention, such as will enable others skilled in the art to which it appertains to make and use the same.
This invention relates to improvements in nest boxes for fowls.

The object of the invention is to provide a nest box having means whereby but one fowl is permitted to enter the box at the same time, means being provided whereby the weight of the eggs deposited in the box will be counterbalanced so as not to interfere with the operating mechanism of the box.

A further object is to provide means whereby a fowl entering the box may be trapped and prevented from leaving the same.

With the above and other objects in view, the invention consists of certain novel features of construction, combination and arrangement of parts, as will be hereinafter described and claimed.

Figure 1:
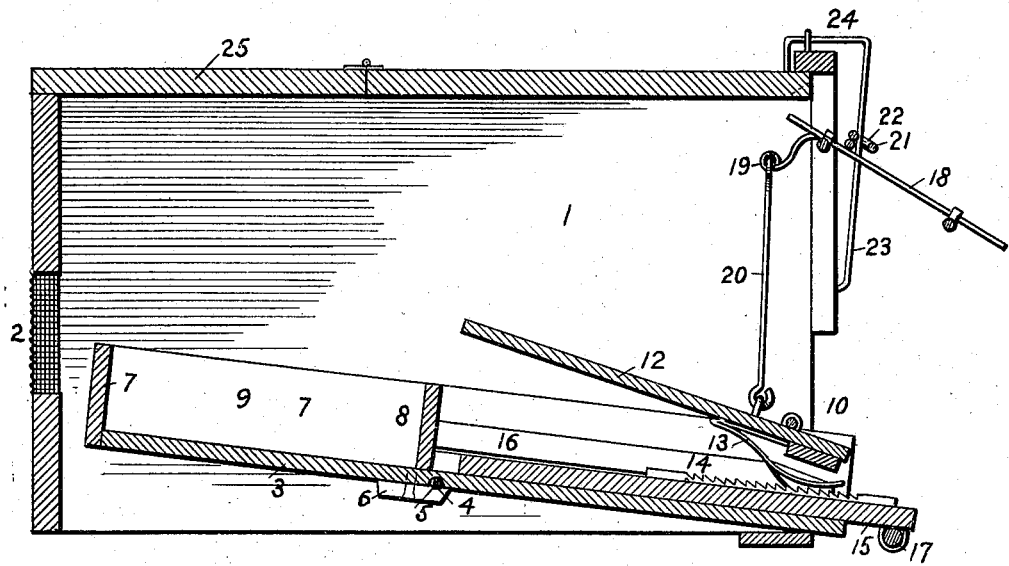
Figure 2:
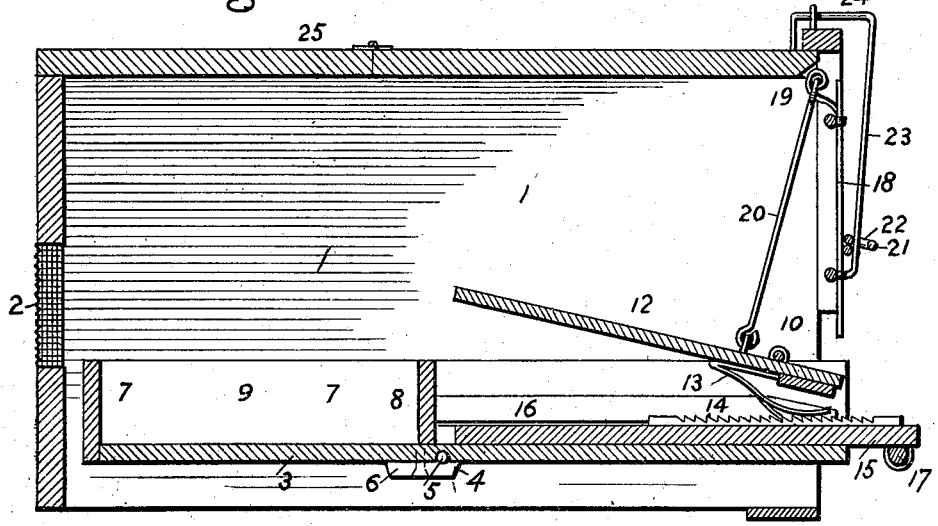

In the accompanying drawings:—Figure 1 is a vertical sectional view of the nest box, showing the position of the parts when not in use; Fig. 2 is a similar view, showing the position of the parts when the box is occupied; Fig. 3 is a front elevation of the box with the parts in the position shown in Fig. 2; and Fig. 4 is a horizontal sectional view through the box.

Referring more particularly to the drawings, 1 denotes the box, which may be of any suitable shape, but which is here shown and is preferably oblong and is open at its bottom and front end, as shown. In the rear end of the box is formed a ventilating opening covered by a screen 2. In the open lower side of the box is arranged a loose bottom 3, said bottom being pivoted midway between its ends upon a transversely-disposed rod or bar 4, preferably seated in a groove or channel 5 formed across the lower side of the bottom. The latter is detachably held in position on said rod by means of a turn-button 6 or other suitable fastening device.

The bottom 3 is provided on its upper side with upwardly-projecting side and rear flanges 7 and with an intermediate flange 8, which forms at the rear end of the bottom a nest box or receptacle 9. Pivotally-mounted between the forward ends of the side flanges upon a transversely-disposed pivot rod or bar 10 is a tilting platform 12, on the under side of which is secured a spring-pawl 13. The pawl 13 is adapted to engage a notched bar or rack 14 secured centrally upon a sliding counterbalancing board or plate 15, which is slidably mounted in suitable guideways 16 in the lower side of the front portion of the bottom, as shown. The outer end of the counterbalancing plate or board 15 is prefer-
ably weighted by a transversely-disposed bar 17. The object of the counterbalancing plate or board is to compensate for the weight of the eggs deposited into the receptacle at the other end of the bottom, the board being moved outwardly to the extent of one notch on the rack bar 14 for each egg laid in the receptacle at the opposite end of the bottom. The plate or board 15 is moved outwardly through the action of the fowls in walking inwardly across the tilting platform 12, the latter being pressed down by the weight of the fowl on the inner end thereof, thus causing the pawl 13 on the under side thereof and in engagement with the rack bar to force the counterbalancing plate or board outwardly to the extent of one tooth, this distance being sufficient to equalize or compensate for the weight of each egg laid in the opposite end of the bottom. As the fowl leaves the box and steps upon the outer end of the tilting platform 12, the inner end of the same will be elevated, thus drawing the pawl back into engagement with the next inner tooth of the rack bar.

Pivotally-mounted at its upper end between the inner sides of the front or open end of the nest box is a gate or door 18, the same being here shown and is preferably of slatted construction. On the upper end adjacent to one side of the gate or door is an inwardly-projecting crank arm 19, to the inner end of which is connected the upper end of an operating rod 20. The lower end of the rod 20 is loosely connected to the outer end of the pivoted platform 12. The weight of the outer end of the bottom is sufficient to swing the gate or door 18 upwardly to an open position, thus permitting a fowl to enter the box. As the fowl passes across the platform 12 to the nest portion or inner end of the bottom, the weight of the fowl will be sufficient to tilt the rear end of the bottom downwardly and the forward end upwardly, thereby swinging the gate downwardly to a closed position, the gate remaining in this position as long as the fowl is at the inner end of the bottom on which the nest is arranged. As soon as the fowl has laid and approaches the forward end of the box her weight upon the outer or forward end of the bottom will tilt said end downwardly, thereby drawing upon the connecting rod or bar 20 and causing the same to swing the gate upwardly to an open position, thus permitting the fowl to leave the box.

Should it be desired to trap any of the fowls entering the box a suitable locking bar 21 is provided, said bar being here shown and is preferably provided adjacent to its opposite ends with guide eyes or loops 22, by means of which it is held in sliding engagement with vertically-disposed guide rods 23 arranged on each side of the door at the forward open end of the box. The bar 21 rests upon the door or gate, so that when the same is brought to a closed position by the weight of the fowl on the inner end of the bottom, said bar will drop to the lower ends of the guide rods 23, thus falling in front of the door and preventing the same from being swung upwardly to an open position until the bar is again raised to a position at the top of the box. The guide bars or rods 23 are preferably provided at their upper ends with rearwardly-extending right angularly-bent projections 24 with which the locking bar is adapted to be engaged and held in an inoperative position above the door.

In the top of the box at the rear end thereof over the nest portion of the bar is arranged a hinged door 25 by means of which access may be had to the eggs deposited at the inner end of the bottom.

While I have shown and described a single form of box, it is obvious and it is the intention when building the same, that they be built in a series of two or more, the interior construction of each being the same so that the description and illustration of one will be sufficient for all. When constructing the boxes in series, the pivot rod 4 which supports the tilting bottom will preferably be continuous throughout the series. By constructing the bottom or operating portion of the box as herein shown and described, the same may be readily taken apart for cleaning or other purposes and after the eggs have been removed from the receptacle at the inner end of the bottom, the counterbalancing board is manually pushed in by disengaging the pawl on the lower end of the tilting platform from the rack bar on said plate.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. A nest box having arranged therein a pivotally mounted bottom having a tilting platform mounted on its front end, a hinged door arranged at the front end of said box, means for connecting said door to the front end of the platform whereby said door is closed on the entrance of a fowl in the box, means for counter-balancing the weight of the eggs deposited on the inner end of the pivoted bottom and means connected with said platform to move said counter-balancing means outward a predetermined distance actuated by the passage of a fowl in and out of the box.

2. A nest box for fowls having an open bottom, and an open front end, a pivotally mounted bottom arranged in the lower open side of the box, an egg receiving compartment on the inner end of said bottom, a pivotally-mounted door adapted to close the open front end of the box, a crank arm on the upper end of said door, a rod connecting said crank arm to the forward end of the bottom whereby the weight of said end will hold the door in an open position, a counterbalancing board slidably-mounted in the forward end of the bottom, and means actuated by the passage of a fowl in and out of the box to move said board outwardly, substantially as described.

3. A nest box for fowls having an open bottom and an open forward end, a pivotally mounted bottom arranged in the lower open side of the box, an egg receiving compartment on the inner end of said bottom, a pivotally-mounted door adapted to close the open forward end of the box, a crank arm on the upper end of said door, a rod connecting said crank arm to the forward end of the bottom, whereby the weight of said end will hold the door in an open position, a counterbalancing board slidably-mounted in the forward end of the bottom, a tilting platform pivotally mounted in the forward end of the bottom, and means on said platform to engage said counterbalancing plate and move the same outwardly to a predetermined distance each time a fowl passes across said platform, substantially as described.

4. A nest box for fowls having an open bottom and an open forward end, a pivotally-mounted bottom arranged in the lower open side of the box, an egg receiving compartment on the inner end of said bottom, a pivotally-mounted door adapted to close the open forward end of the box, a crank arm on the upper end of said door, a rod connecting said crank arm to the forward end of the bottom, whereby the weight of said end will hold the door in an open position, a counterbalancing board slidably-mounted in the forward end of the bottom, a rack bar on said counterbalancing plate, a pivotally-mounted platform arranged in the forward end of the bottom above said plate, a pawl carried by said platform to consecutively engage the teeth of said rack bar, whereby upon the passage of a fowl back and forth across the platform, the latter will be actuated to force the board or counterbalancing plate outwardly, substantially as described.

5. A nest box for fowls having an open lower side and forward end, a bottom pivotally-mounted in said lower open side, a door hingedly-mounted in said forward open end, means whereby the door is held in an open position by the weight of the forward end of the platform and closed by the weight of a fowl on the inner end of the same and a slidably-mounted locking bar adapted to automatically hold said door in closed position when said bar is arranged in an operative position, substantially as described.

6. A nest box for fowls having open lower and front ends and a ventilating opening in its rear end covered by a wire netting, a bottom pivotally arranged in the said open lower end, a slatted door hingedly mounted in the forward open end of the box, a crank arm on said door, a rod connecting said crank arm to the front end of said bottom, whereby the weight of the latter will hold said door in an open position and whereby the weight of the fowl on the inner end of the bottom will close said door, guide rods arranged on the forward end of the box, a locking bar slidably mounted on said guide rods to drop in front of the door when in a closed position, means on the upper end of said guide rods to hold said locking bar in an inoperative position, and means arranged in the bottom of the box to counterbalance the weight of the eggs deposited on the inner end of said bottom, substantially as described.

In testimony whereof I have hereunto set my hand in presence of two subscribing witnesses.

ALBERT D. CROSLEY.

Witnesses:
I. J. SAYRS,
ALPHEUS ALEXANDER.